United States Patent
Senba

(10) Patent No.: US 8,683,248 B2
(45) Date of Patent: Mar. 25, 2014

(54) ELECTRONIC APPARATUS, ELECTRONIC APPARATUS POWER CONTROL, ELECTRONIC APPARATUS POWER CONTROL PROGRAM, AND STORAGE MEDIUM STORING POWER CONTROL PROGRAM

(75) Inventor: Kei Senba, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 339 days.

(21) Appl. No.: 13/251,467

(22) Filed: Oct. 3, 2011

(65) Prior Publication Data

US 2012/0096294 A1    Apr. 19, 2012

(30) Foreign Application Priority Data

Oct. 14, 2010  (JP) .................................. 2010-232032

(51) Int. Cl.
*G06F 1/32* (2006.01)
*G06F 1/00* (2006.01)
*G05F 1/10* (2006.01)
*H02M 3/24* (2006.01)

(52) U.S. Cl.
USPC .............. 713/323; 713/321; 363/95; 327/545

(58) Field of Classification Search
USPC ....................... 713/323, 321; 327/545; 363/95
See application file for complete search history.

(56) References Cited

U.S. PATENT DOCUMENTS

| | | | |
|---|---|---|---|
| 6,590,793 B1 * | 7/2003 | Nagao et al. | 363/95 |
| 2005/0268131 A1 * | 12/2005 | Matsunobu | 713/323 |
| 2006/0114750 A1 * | 6/2006 | Iida et al. | 368/67 |
| 2008/0276109 A1 * | 11/2008 | Yoshida | 713/323 |
| 2013/0054037 A1 * | 2/2013 | Ikawa et al. | 700/286 |

FOREIGN PATENT DOCUMENTS

| | | |
|---|---|---|
| JP | 2002078196 A | 3/2002 |
| JP | 2003191576 A | 7/2003 |

* cited by examiner

*Primary Examiner* — Paul R Myers
*Assistant Examiner* — Christopher A Daley
(74) *Attorney, Agent, or Firm* — Harness, Dickey & Pierce, P.L.C.

(57) ABSTRACT

An electronic apparatus includes a first power source to generate power from external power; a photovoltaic power generation device to generate power from received light as cell-generated power; a power storage device to store cell-generated power; a second power source to generate power from cell-generated power; a mode switching unit to switch between normal power supply mode and reduced-power mode, in normal power supply mode, power is supplied from the first power source to the electronic apparatus, and in reduced-power mode, power supply from the first power source is stopped and power is supplied from the second power source; a voltage detector to detect voltage of cell-generated power; a memory to store condition-specific threshold voltages to determine conditions of the electronic apparatus; and a power supply controller to control switching between normal power supply mode and reduced-power mode by comparing the voltage of cell-generated power and the condition-specific threshold voltages.

8 Claims, 7 Drawing Sheets

ELECTRONIC APPARATUS, ELECTRONIC APPARATUS POWER CONTROL, ELECTRONIC APPARATUS POWER CONTROL PROGRAM, AND STORAGE MEDIUM STORING POWER CONTROL PROGRAM

CROSS-REFERENCE TO RELATED APPLICATIONS

This application claims priority to Japanese Patent Application No. 2010-232032, filed on Oct. 14, 2010 in the Japan Patent Office, which is incorporated by reference herein its entirety.

BACKGROUND OF THE INVENTION

1. Field of the Invention

The present invention relates to an electronic apparatus such as information processing apparatus, an electronic apparatus power control method, an electronic apparatus power control program, and a storage medium storing a power control program, and more particularly to an electronic apparatus using a photovoltaic power generation device such as a solar cell.

2. Description of the Background Art

Electrical or electronic apparatuses have been required to reduce power consumption out of concern for the environment. Regulations and standards for energy-efficient consumer products have been introduced around the world to reduce power consumption, with the values for such standards set by initiatives such as the International Energy Star Program or the like.

More and more image processing apparatuses, such as copiers, facsimile machines, printers, and multi-functional apparatuses having image processing and image forming capabilities, have been designed to be energy-efficient. Increasingly, users consider the energy-efficiency of image processing apparatuses when purchasing such apparatuses, such as low power consumption in a normal operation mode and a reduced-power mode, out of concern for the environment and a desire to reduce their electric utility bills.

JP-2002-078196-A discloses a power supply system using a main power source and an auxiliary power source such as a solar cell circuit. The main power source supplies power to each unit during normal operation and the solar cell circuit supplies minimum required power in the energy save mode. The voltage of the solar cell circuit is monitored and the main power source is turned on when the voltage of the solar cell circuit decreases below a given threshold value, thereby providing a stable power supply.

However, in such conventional art, the power generated by the solar cell circuit is just used as an alternative to the main power source. For example, the power generated by the solar cell circuit is supplied to those units that need power even in the reduced-power mode, and when the voltage of power generated by the solar cell falls to a given threshold value, the power supply to the apparatus is switched from the solar cell to the main power source. As such, the power generated by the solar cell is used only as an alternative power source.

SUMMARY

In one aspect of the invention, an electronic apparatus is devised. The electronic apparatus includes a first power source to generate power to be used for the electronic apparatus from power supplied from an external power source; a photovoltaic power generation device to generate power having a voltage corresponding to an intensity of external light received by the photovoltaic power generation device as cell-generated power; a power storage device to store the cell-generated power generated by the photovoltaic power generation device; a second power source to generate power to be used for the electronic apparatus from the cell-generated power stored in the power storage device; a mode switching unit to switch between a normal power supply mode and a reduced-power mode, wherein in the normal power supply mode power is supplied from the first power source to each unit in the electronic apparatus while in the reduced-power mode the power supply from the first power source to each unit in the electronic apparatus is stopped and power is supplied from the second power source to only certain predetermined units in the electronic apparatus; a voltage detector to detect the voltage of the cell-generated power output from the photovoltaic power generation device; a memory to store a given number of condition-specific threshold voltages useable to determine a given number of specific conditions of the electronic apparatus; and a power supply controller to compare the voltage of the cell-generated power detected by the voltage detector and the condition-specific threshold voltages and control the mode switching unit to switch between the normal power supply mode and the reduced-power mode.

In another aspect of the invention, a method of controlling power supply for an electronic apparatus is devised. The method includes steps of 1) generating primary power to be used for the electronic apparatus from power supplied from an external power source; 2) generating photovoltaic power having a voltage corresponding to intensity of an external light received by a photovoltaic power generation device; 3) storing the photovoltaic power to a power storage device; 4) generating secondary power to be used for the electronic apparatus from the power stored in the power storage device; 5) switching between a normal power supply mode and a reduced-power mode, wherein in the normal power supply mode power is supplied to each unit in the electronic apparatus using the primary power, and in the reduced-power mode the supply of primary power is stopped and power is supplied to certain predetermined units in the electronic apparatus using the secondary power; 6) detecting voltage of the photovoltaic power; 7) comparing the voltage of the power detected in the voltage detecting step and condition-specific threshold voltages stored in a memory and correlated with a given number of condition-specific threshold voltages useable to determine a given number of specific conditions of the electronic apparatus; and 8) controlling the switching between the normal power supply mode and the reduced-power mode conduct-able by the mode switching step based on a result of the comparing step.

In another aspect of the invention, a non-transitory computer-readable medium storing a program comprising instructions that when executed by a computer cause the computer to execute a method of controlling power supply for an electronic apparatus is devised. The method includes the steps of 1) generating primary power to be used for the electronic apparatus from power supplied from an external power source; 2) generating photovoltaic power having a voltage corresponding to intensity of an external light received by a photovoltaic power generation device; 3) storing the photovoltaic power to a power storage device; 4) generating secondary power to be used for the electronic apparatus from the power stored in the power storage device; 5) switching between a normal power supply mode and a reduced-power mode, wherein in the normal power supply mode power is supplied to each unit in the electronic apparatus using the primary power, and in the reduced-power mode the supply of primary power is stopped and power is supplied to certain predetermined units in the electronic apparatus using the secondary power; 6) detecting voltage of the photovoltaic power; 7) comparing the voltage of the power detected in the voltage detecting step and condition-specific threshold voltages stored in a memory and correlated with a given number of condition-specific threshold voltages useable to determine a given number of specific conditions of the electronic apparatus; and 8) controlling the switching between the normal power supply mode and the reduced-power mode conductable by the mode switching step based on a result of the comparing step.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
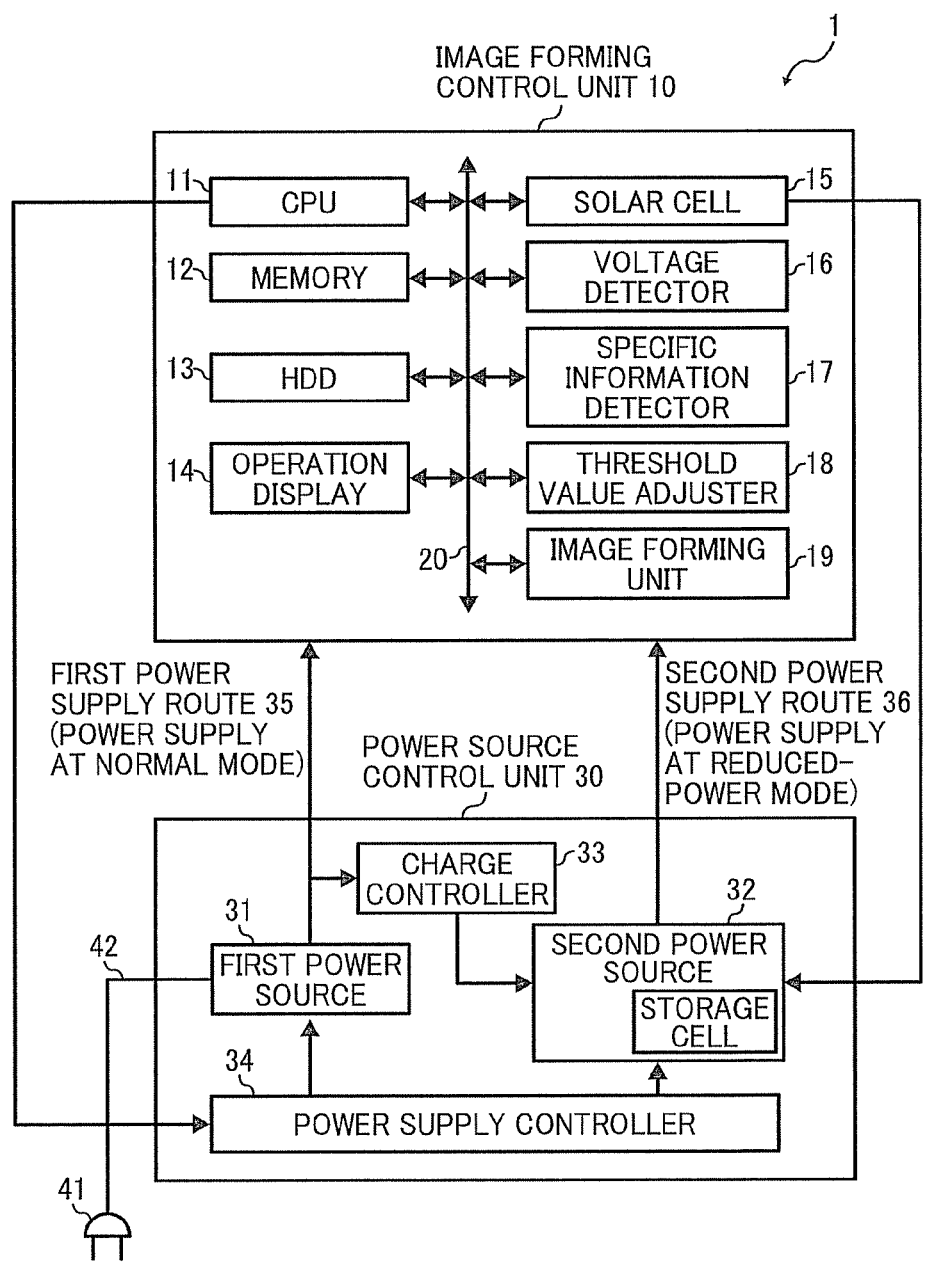
FIG. 1 shows a block diagram of an image forming apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such team are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result.

Referring now to the drawings, a power supply system according to example embodiments is described below.

FIGS. 1 to 7 show an information processing apparatus, a power control method of information processing apparatus such as an image processing apparatus, a power control program of information processing apparatus, and a storage medium of power control program according to an example embodiment. It should be noted that the information processing apparatus such as the image processing apparatus is just one example of electronic apparatuses.

FIG. 1 shows a block diagram of an image processing apparatus 1 according to an example embodiment, which can be used as an image forming apparatus 1 such as a copier, a printer, a facsimile machine, and a multi-functional apparatus having a combined functionality.

As shown in FIG. 1, the image processing apparatus 1 includes, for example, an image forming control unit 10, and a power source control unit 30. The power source control unit 30 includes a power cord 42 having a power plug 41 at one end of the power cord 42, in which the power cord 42 is connected to the power source control unit 30. The power plug 41 can be inserted into a socket of a grid power such as a commercial power supply to supply power to the power source control unit 30 via the power cord 42.

The image forming control unit 10 includes a central processing unit (CPU) 11, a memory 12, a hard disk (HDD) 13, an operation display 14, a solar cell 15, a voltage detector 16, a specific information detector 17, a threshold value adjuster 18, and an image forming unit 19, which are connected to each other via a bus 20.

The memory or storage 12, which may be a random access memory (RAM) having a backup battery, can be used as a working memory of the CPU 11. For example, the memory 12 temporarily stores image data converted from print job data, and stores one or more condition-specific threshold voltages useable for a power control process to be described later.

The hard disk 13 stores print jobs, image data temporarily stored in the memory 12, and programs under the control of CPU 111. Further, the storage area of the condition-specific threshold voltage is not limited to the memory 12, but the hard disk 13 can be used as the storage area.

The operation display 14 includes operation keys to operate the image processing apparatus 1, a display device such as liquid crystal display (LCD), and a lamp such as a light emitting diode (LED). The operation keys of the operation display 14 can be used to conduct an image forming process such as a printing operation using the image processing apparatus 1, and a power control process to be described later. The display device can display instructions input from the operation keys and can display information to report status of the image processing apparatus 1 to a user or operator.

The solar cell 15, useable as a photovoltaic power generation device, may be disposed, for example, at or near the operation keys and display device of the operation display 14, but its position is not limited thereto. The solar cell 15 can generate power by receiving light from an external environment and then converting the input light to power having a voltage corresponding to the light intensity of the received external light, and stores the generated power in a second power source 32. Hereinafter, the power generated by the solar cell 15 may be referred to as "cell-generated power." The second power source 32 may have a rechargeable battery, a storage cell, or a secondary cell, which can be charged by the power generated by the solar cell 15.

The light intensity condition at the place of installation of the image processing apparatus 1 and an installation condition of the image processing apparatus 1 such as position and orientation of the image processing apparatus 1 may have some effect on the light intensity of the external light to be received by the solar cell 15, and thereby have some effect on the cell-generated power of the solar cell 15.

The threshold value adjuster 18 can store various condition-specific threshold voltages in the memory 12 in a table format, wherein each of the condition-specific threshold voltages indicates a specific condition at, near, or around the image processing apparatus 1, and each of the condition-specific threshold voltages corresponds to the light intensity entering the solar cell 15. Each of the condition-specific threshold voltages can be determined by converting the intensity of light received by the solar cell 15 into a voltage, by which each of specific conditions is corresponded to each of the condition-specific threshold voltages.

For example, such condition-specific threshold voltages may be categorized as follows, but are not limited thereto. 1) user presence detection threshold voltage (user existence detection threshold voltage) to determine that a user is present near the image processing apparatus 1; 2) no-user presence detection threshold voltage (or no-user existence detection threshold voltage) to determine that a user is not present near the image processing apparatus 1; 3) light-ON detection threshold voltage to determine that light is ON at an installation place of the image processing apparatus 1; 4) light-OFF detection threshold voltage to determine that light is OFF at an installation place of the image processing apparatus 1.

An administrator of the image processing apparatus 1 may consider the light intensity condition of an installation place of the image processing apparatus 1 and/or the installation condition such as position and orientation of the image processing apparatus 1 when to set and/or adjust the condition-specific threshold voltage. Specifically, using the operation display 14, an administrator of the image processing apparatus 1 can select the threshold voltage matched to a specific condition of the image processing apparatus 1 from the table stored in the memory 12. For example, the above-mentioned user presence detection threshold voltage, no-user presence detection threshold voltage, light-ON detection threshold voltage, and light-OFF detection threshold voltage can be selected, and can be set and/or adjusted using the threshold value adjuster 18.

The voltage detector 16 detects voltage of power generated by the solar cell 15 (cell-generated power), and compares the detected voltage of cell-generated power with the condition-specific threshold voltages set in the threshold value adjuster 18, then outputs the comparison result to the specific information detector 17.

Based on the detection result of the voltage detector 16, the specific information detector 17 detects that the image processing apparatus 1 is at a specific condition, and outputs the detection result to the CPU 11.

When the image forming unit 19 receives image data from the memory 12 or the hard disk 13, the image forming unit 19 prints out an image on a sheet based on the image data using an image forming process, for example, electrophotography, the ink jet method, or the like under the control of CPU 11. The image forming unit 19 using electrophotography includes a photoconductor, a writing unit, a development unit, a charging unit, a de-charging unit, and a cleaning unit used for the image forming process. In the image forming unit 19, the writing unit writes a latent image on the photoconductor using image drawing data and control signals. The development unit supplies toner onto the photoconductor to develop the latent image on the photoconductor as a toner image. In the image forming unit 19, the sheet can be fed from a sheet feeder to the photoconductor and a transfer unit, by which the toner image on the photoconductor is transferred on the sheet. The sheet transferred with the toner image is transported to a fusing unit. The fusing unit applies heat and pressure on the sheet to fuse the toner image on the sheet, by which the image is formed on the sheet.

The power source control unit 30 includes a first power source 31, a second power source 32, a charge controller 33, and a power supply controller 34, in which the first power source 31 is connected to the power cord 42.

The first power source 31 uses grid power or an external power source such as an alternating current (AC) 100V power source, supplied through the power plug 41 and the power cord 42 to generate alternating current (AC) power and direct current (DC) power required for each unit in the image processing apparatus 1. For example, the first power source 31 supplies power to each unit in the image processing apparatus 1 such as the image forming control unit 10 and the charge controller 33 via a first power supply route 35.

The second power source 32 is connected to the solar cell 15, and the solar cell 15 can charge a storage cell or secondary cell disposed in the second power source 32. The storage cell, useable as a power storage device, has a given capacity. Charges stored in the storage cell of the second power source 32 can be supplied as DC power to each unit of the image processing apparatus 1 such as the image forming control unit 10 via a second power supply route 36.

The charge controller 33, useable as a charger, charges the storage cell of the second power source 32 using some of the power output from the first power source 31 based on the instruction from the CPU 11. As such, the storage cell of the second power source 32 can be charged by the solar cell 15 or by the first power source 31 via the charge controller 33.

The power supply controller 34 conducts the supply and shutdown control for power supply-able from the first power source 31, and the supply and shutdown control for power supply-able from the second power source 32 under the control of CPU 11. As such, the CPU 11 and the power supply controller 34 may function as a mode switching unit and a power supply control unit as a whole.

Further, as for the image processing apparatus 1, a power control program of image processing apparatus 1 is loaded on the memory 12 or the hard disk 13 to execute a power control method for the image processing apparatus 1, in which a change of environmental or ambient condition of the image processing apparatus 1 can be detected by monitoring the cell-generated power of the solar cell 15, and a power control method in view of the change of environmental condition can be executed.

In the above-described example embodiment, a computer can be used with a computer-readable program, written in object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an electronic apparatus such as information processing apparatus, image processing apparatus, image forming apparatus using a computer-readable program, which can execute the above-described processes or steps. Further, in the above-described exemplary embodiment, a storage device (or recording medium), which can store computer-readable program, may be a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, hard disk in a server, or the like, but not limited these. Further, a computer-readable program can be downloaded to a particular computer (e.g., personal computer) via a network such as the internet, or a computer-readable program can be installed to a particular computer from the above-mentioned storage device, by which the particular computer may be used for the system or apparatus according to an example embodiment, for example.

A description is now given of the effect of the configuration according to an example embodiment described above. The condition-specific threshold voltages matched to installation environmental conditions of the image processing apparatus 1 can be preset for the image processing apparatus 1. The voltage of cell-generated power of the solar cell 15 is compared with such preset condition-specific threshold voltages to determine a specific condition of the image processing apparatus 1. Specifically, it is determined whether a user or operator is present near the image processing apparatus 1 or not, and whether light is ON at an installation place of the image processing apparatus 1 or not. Upon determining the specific condition of the image processing apparatus 1 by such comparison, the power supply mode of the image processing apparatus 1 can be automatically shifted to a mode suitable for the determined specific condition.

Figure 2:
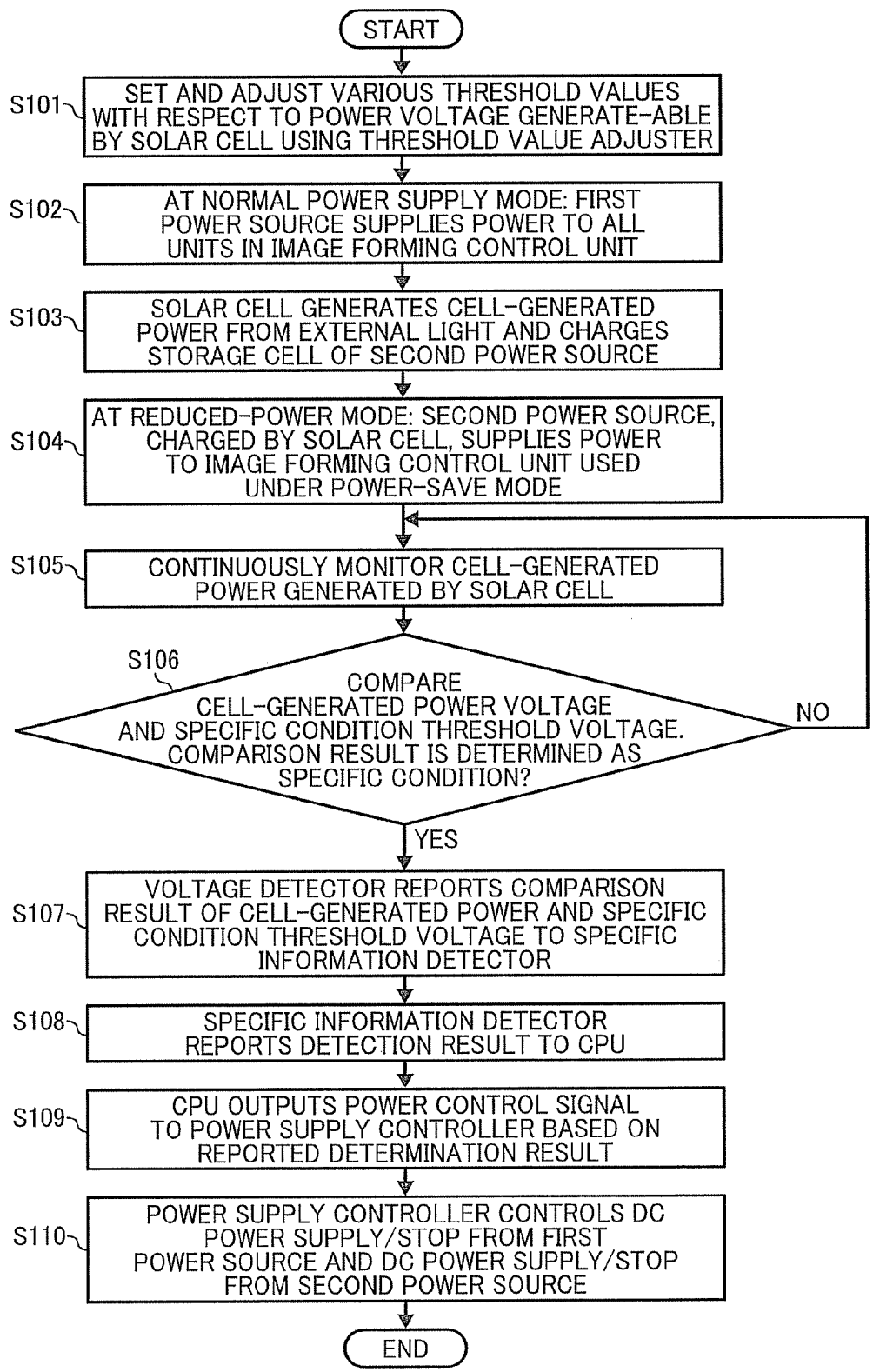
FIG. 2 shows a flowchart of steps in a basic process of power control.

A description is given of a basic process to determine a specific condition of the image processing apparatus 1, in which a voltage of power generated by the solar cell 15 (cell-generated power) is compared with the condition-specific threshold voltages set for each of environmental conditions of the image processing apparatus 1. FIG. 2 shows a flowchart of steps in a basic process of power control.

The condition-specific threshold voltages may be set for the image processing apparatus 1 as follows. An administrator of the image processing apparatus 1 selects a condition-specific threshold voltage setting mode using the operation display 14. Specifically, the condition-specific threshold voltages to determine specific conditions of the image processing apparatus 1, which are stored in the memory 12 as a table format such as a threshold value table, can be read from the memory 12, and then displayed on a display device of the operation display 14 by the threshold value adjuster 18. Based on the display, the administrator can select the condition-specific threshold voltage to be set for the image processing apparatus 1, by which the condition-specific threshold voltage used as a condition determination voltage is set to the memory 12 (step S101) to determine an environmental condition of the image processing apparatus 1. As such, the environmental condition of the image processing apparatus 1 can be determined.

When the image forming unit 19 is operated under the normal power supply mode, the CPU 11 instructs the power supply controller 34 to supply power to an entire part of the image forming control unit 10 from the first power source 31 (step S102), and the solar cell 15 generates power (cell-generated power) from an external light such as room light of a room where the image processing apparatus 1 is installed, and such cell-generated power is used to charge the storage cell of the second power source 32 (step S103).

When the image forming unit 19 is operated under the reduced-power mode, the CPU 11 instructs the power supply controller 34 to supply power to the image forming control unit 10 from the second power source 32. Specifically, charges generated by the solar cell 15 and stored in the storage cell of the second power source 32 can be used to supply power that the image forming control unit 10 needs to be supplied under the reduced-power mode (step S104), in which power is supplied partially to the image forming control unit 10.

The voltage detector 16 may continuously detect or monitor the cell-generated power voltage generated by the solar cell 15 during the normal power supply mode and the reduced-power mode (step S105). The detected cell-generated power voltage is compared with various condition-specific threshold voltages set by the threshold value adjuster 18, and checks whether the comparison result indicates a specific condition (step S106).

If the comparison result of the cell-generated power voltage of the solar cell 15 and various condition-specific threshold voltages does not indicate a specific condition, the process returns to step S105, and the voltage detector 16 repeats the detection of cell-generated power of the solar cell 15 and then conducts a comparison processing at steps S105 and S106.

If the comparison result of the cell-generated power voltage of the solar cell 15 and the various condition-specific threshold voltages indicates one specific condition, the voltage detector 16 reports the comparison result of the cell-generated power voltage and the condition-specific threshold voltages to the specific information detector 17 (step S107).

Upon receiving a report of the comparison result of the cell-generated power voltage and the condition-specific threshold voltages from the voltage detector 16, the specific information detector 17 detects a current specific condition of the image processing apparatus 1 based on the comparison result, and reports a detection result to the CPU 11 (step S108).

Based on the determination result of specific condition reported from the specific information detector 17, the CPU 11 outputs a power control signal to the power supply controller 34 (step S109). Based on power control signal from the CPU 11, the power supply controller 34 controls DC power supply and stop from the first power source 31, and/or DC power supply and stop from the second power source 32 (step S110).

Figure 3:
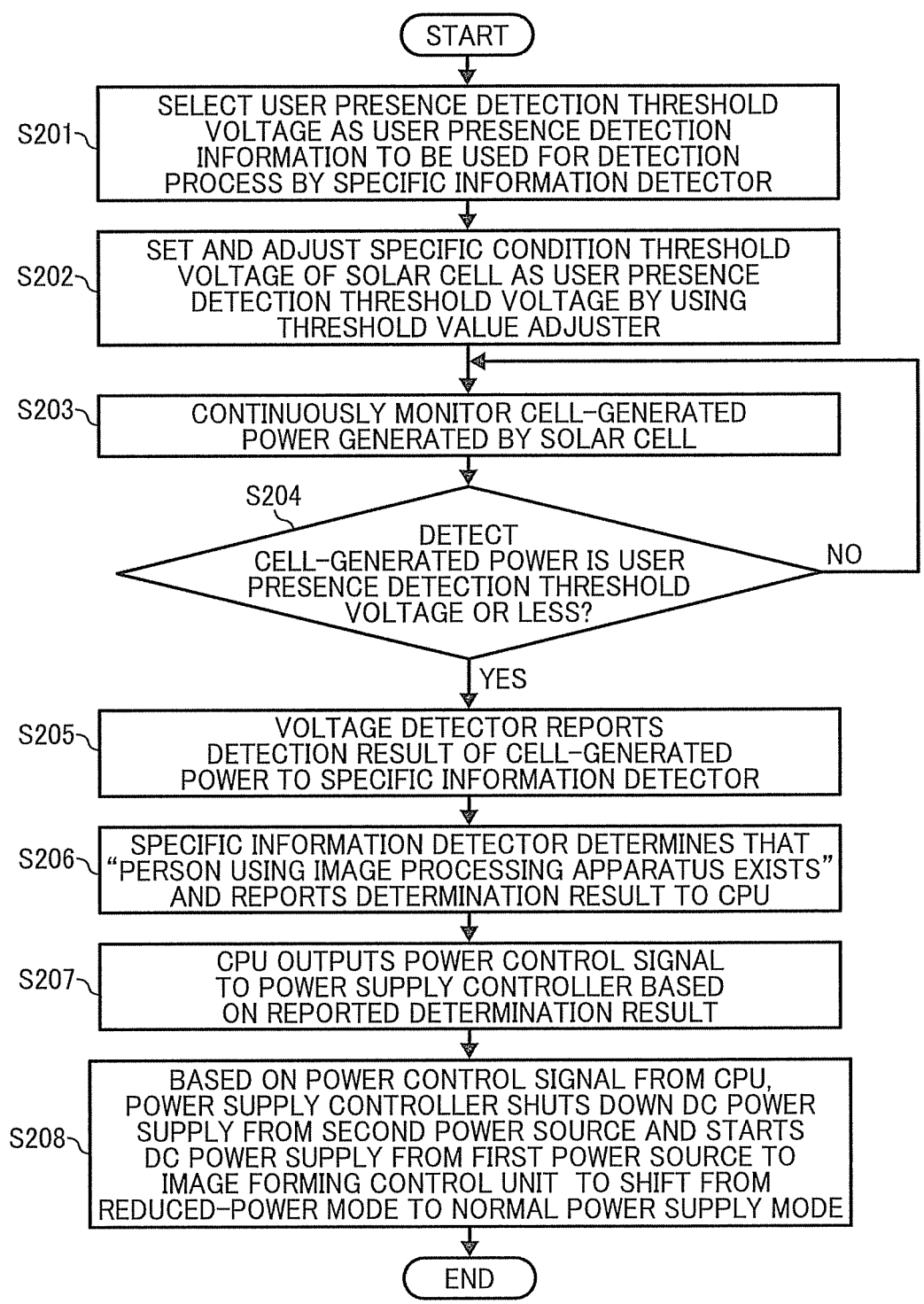
FIG. 3 shows a flowchart of steps in a process of power control by detecting ambient condition of image forming apparatus using user presence information as specific information, in which a mode shifts to a normal power supply mode.

A description is given of setting user presence detection information for the image processing apparatus 1 to detect whether a human body of user or operator exists near the image processing apparatus 1. When the user presence detection threshold voltage to determine whether a user is present near the image processing apparatus 1 is set as the condition-specific threshold voltage, a power control process for the image processing apparatus 1 can be executed as shown in FIG. 3.

When an administrator selects the user presence detection threshold voltage (or user existence detection threshold voltage) from the threshold table stored in the memory 12 by operating the operation display 14 (step S201), the threshold value adjuster 18 sets the user presence detection threshold voltage to the memory 12 as the condition-specific threshold voltage (step S202) to determine an environmental condition of the image processing apparatus 1. As such, the environmental condition of the image processing apparatus 1 can be determined.

The voltage detector 16 may continuously detect or monitor the cell-generated power voltage generated by the solar cell 15 during the reduced-power mode (step S203). The detected cell-generated power voltage is compared with the user presence detection threshold voltage set by the threshold value adjuster 18, and checks whether the cell-generated power voltage becomes the user presence detection threshold voltage or less (step S204).

If the cell-generated power voltage of the solar cell 15 is greater than the user presence detection threshold voltage, the process returns to step S203, and the voltage detector 16 repeats the detection of cell-generated power voltage of the solar cell 15 and then conducts a comparison processing at steps S203 and S204.

If the cell-generated power voltage of the solar cell 15 becomes the user presence detection threshold voltage or less, the voltage detector 16 reports the detection result that the cell-generated power voltage becomes the user presence detection threshold voltage or less to the specific information detector 17 (step S205).

Upon receiving a report of the detection information that the cell-generated power voltage becomes the human voltage existence detection threshold voltage or less from the voltage detector 16, the specific information detector 17 determines that "a person using the image processing apparatus exists", and reports the determination result to the CPU 11 (step S206).

Based on the detection information reported from the specific information detector 17, the CPU 11 outputs a power control signal to the power supply controller 34 (step S207).

Based on the power control signal from the CPU 11, the power supply controller 34 shutdowns the supply of DC power to the image forming control unit 10 from the second power source 32 that is conducted during the reduced-power mode, and the power supply controller 34 initiates or starts the supply of DC power to the image forming control unit 10 from the first power source 31, and the image forming control unit 10 shifts from the reduced-power mode to the normal power supply mode (step S208). In this description, such mode shifting can be referred to mode switching.

Figure 4:
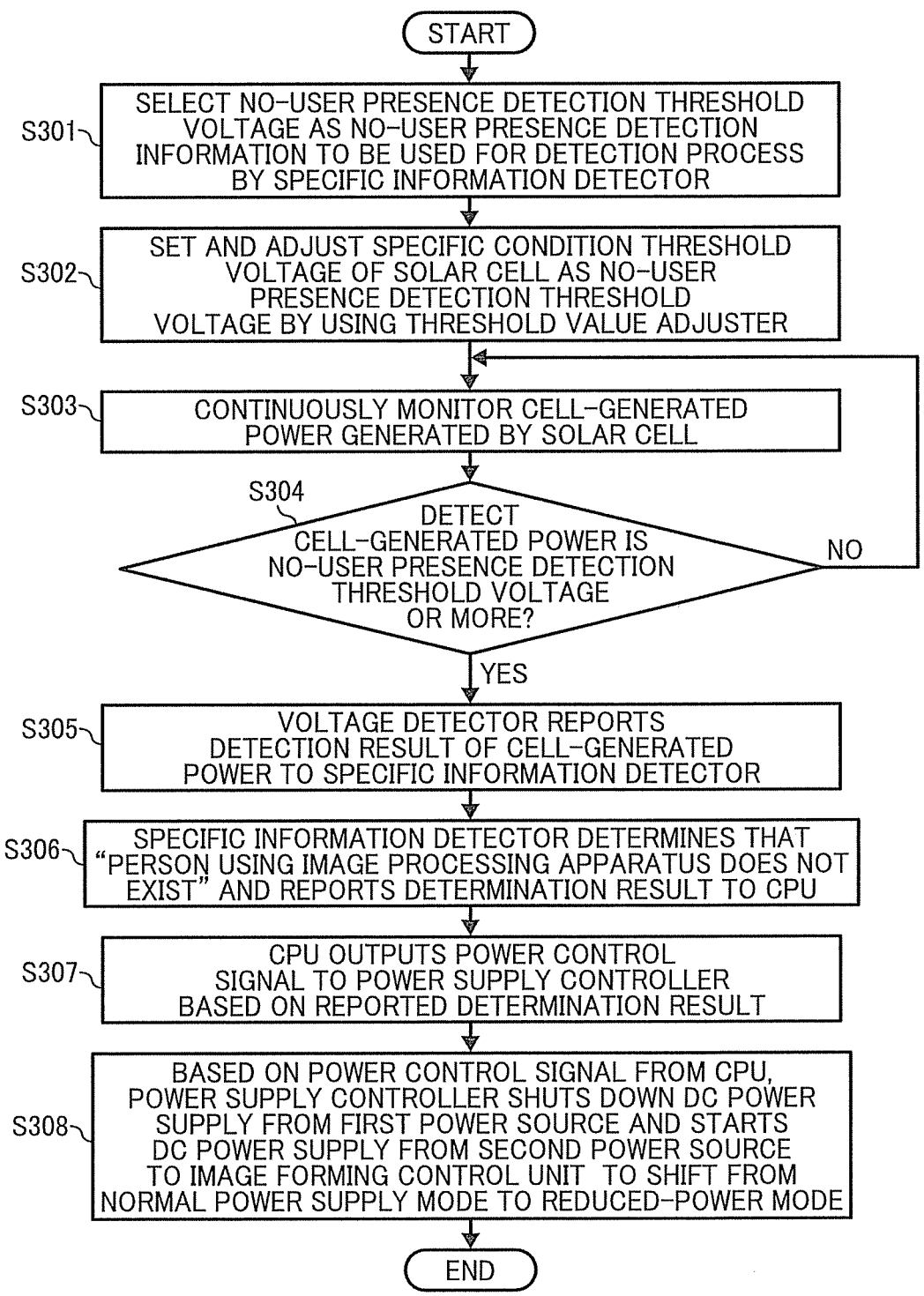
FIG. 4 shows a flowchart of steps in a process of power control by detecting ambient condition of image forming apparatus using no-user presence information as specific information, in which a mode shifts to reduced-power mode.

A description is given of setting no-user presence detection information for the image processing apparatus 1 to detect whether no human body of user or operator exists near the image processing apparatus 1. When the no-human user presence detection threshold voltage to determine whether a user or operator does not exist near the image processing apparatus 1 is set as the condition-specific threshold voltage, a power control process for the image processing apparatus 1 can be executed as shown in FIG. 4.

When an administrator selects the no-user presence detection threshold voltage from the threshold table stored in the memory 12 by operating the operation display 14 selected (step S301), the threshold value adjuster 18 sets the no-user presence detection threshold voltage to the memory 12 as the condition-specific threshold voltage (step S302) to determine an environmental condition of the image processing apparatus 1. As such, the environmental condition of the image processing apparatus 1 can be determined.

The voltage detector 16 may continuously detect or monitor the cell-generated power voltage generated by the solar cell 15 during the normal power supply mode that the grid power is supplied to the first power source 31, wherein the grid power is converted and adjusted to a power level used for the image forming apparatus 1 by the first power source 31 (step S303).

The detected cell-generated power voltage is compared with the no-user presence detection threshold voltage set by the threshold value adjuster 18, and checks whether the cell-generated power voltage becomes the no-user presence detection threshold voltage or more (step S304).

If the cell-generated power voltage of the solar cell 15 is less than the no-user presence detection threshold voltage, the process returns to step S303, and the voltage detector 16 repeats the detection of cell-generated power of the solar cell 15 and then conducts a comparison processing at steps S303 and S304.

If the cell-generated power voltage of the solar cell 15 becomes the no-user presence detection threshold voltage or more, the voltage detector 16 reports the detection result that the cell-generated power becomes the no-user presence detection threshold voltage or more to the specific information detector 17 (step S305).

Upon receiving a report of the detection information that the cell-generated power becomes the no-user presence detection threshold voltage or more from the voltage detector 16, the specific information detector 17 determines that "a person using the image processing apparatus does not exist", and reports the determination result to the CPU 11 (step S306).

Based on the detection information reported from the specific information detector 17, the CPU 11 outputs a power control signal to the power supply controller 34 (step S307).

Based on the power control signal from the CPU 11, the power supply controller 34 shutdowns the supply of DC power to the image forming control unit 10 from the first power source 31, which is the normal power supply mode, and the power supply controller 34 initiates or starts the supply of DC power to the image forming control unit 10 from the second power source 32 using charges stored in the storage cell of the second power source 32, and the image forming control unit 10 shifts from the normal power supply mode to the reduced-power mode (step S308).

Figure 5:
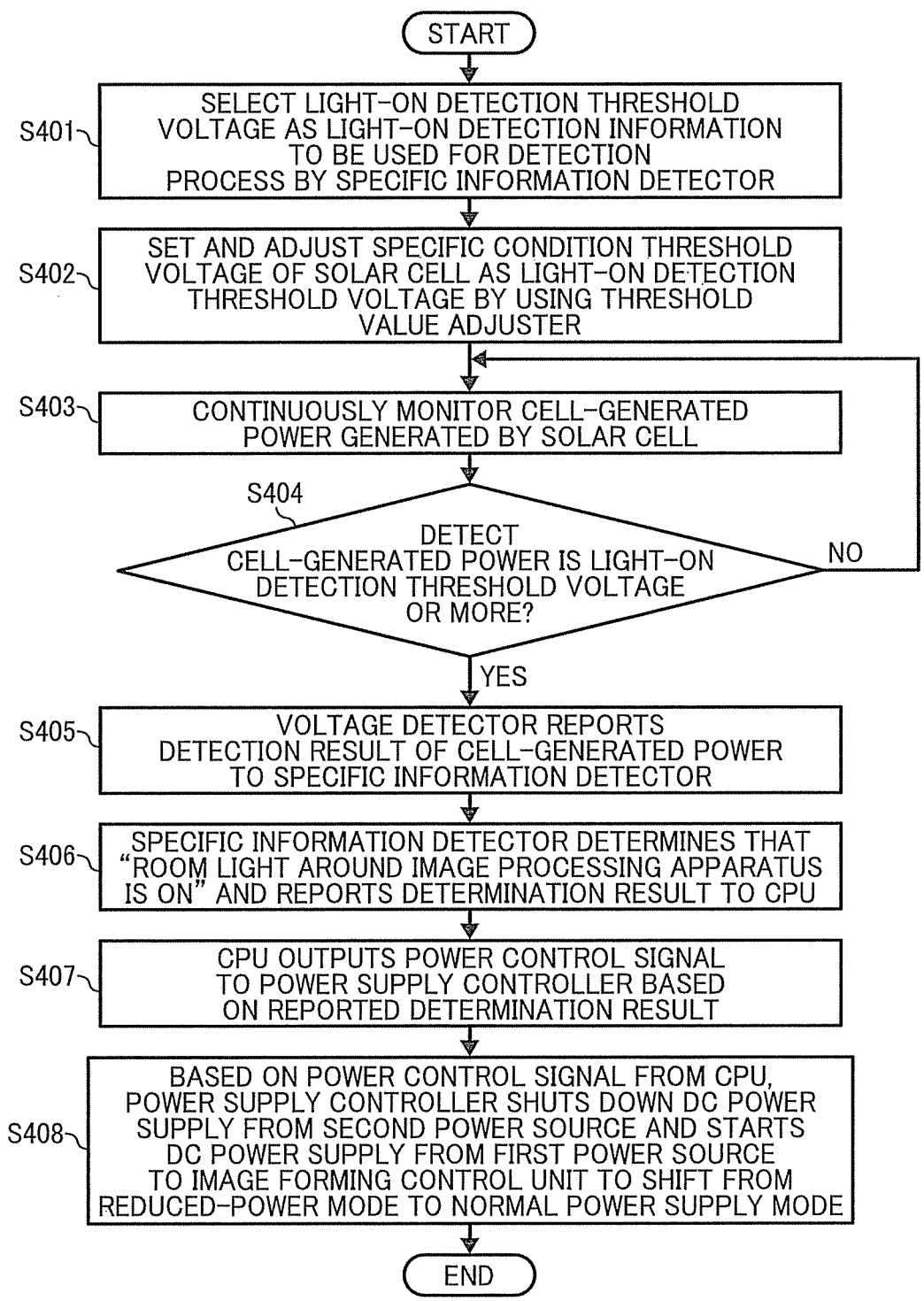
FIG. 5 shows a flowchart of steps in a process of power control by detecting ambient condition of image forming apparatus using light-ON information as specific information, in which a mode shifts to a normal power supply mode.

A description is given of setting light-ON detection information for the image processing apparatus 1 to detect whether light is ON in an installation place of the image processing apparatus 1, in which the light is external or ambient light such as room light, but not limited thereto. When the light-ON detection threshold voltage to determine whether light is ON in an installation place of the image processing apparatus 1 is set as the condition-specific threshold voltage, a power control process for the image processing apparatus 1 can be executed as shown in FIG. 5. The light-ON detection threshold voltage can be used whether the light intensity around the image processing apparatus 1 becomes a given level or more.

When an administrator selects a light-ON detection threshold voltage from the threshold table stored in the memory 12 by operating the operation display 14 selected (step S401), the threshold value adjuster 18 sets the light-ON detection threshold voltage to the memory 12 as the condition-specific threshold voltage (step S402) to determine an environmental condition of the image processing apparatus 1. As such, the environmental condition of the image processing apparatus 1 can be determined.

The voltage detector 16 may continuously detect or monitor the cell-generated power voltage generated by the solar cell 15 during the reduced-power mode (step S403).

The detected cell-generated power voltage is compared with the light-ON detection threshold voltage set by the threshold value adjuster 18, and checks whether the cell-generated power voltage of the solar cell 15 becomes the light-ON detection threshold voltage or more (step S404).

If the cell-generated power voltage of the solar cell 15 is less than the light-ON detection threshold voltage, the process returns to step S403, and the voltage detector 16 repeats the detection of cell-generated power voltage of the solar cell 15 and then conducts a comparison processing at steps S403 and S404.

If the cell-generated power voltage of the solar cell 15 becomes the light-ON detection threshold voltage or more, the voltage detector 16 reports the detection result that the cell-generated power voltage becomes the light-ON detection threshold voltage or more to the specific information detector 17 (step S405).

Upon receiving a report of the detection information that the cell-generated power voltage becomes the light-ON detection threshold voltage or more from the voltage detector 16, the specific information detector 17 determines that "room light around the image processing apparatus is ON" and reports the determination result to the CPU 11 (step S406).

Based on the detection information reported from the specific information detector 17, the CPU 11 outputs a power control signal to the power supply controller 34 (step S407).

Based on the power control signal from the CPU 11, the power supply controller 34 shutdowns the supply of DC power to the image forming control unit 10 from the second power source 32 during the reduced-power mode, and the power supply controller 34 initiates or starts the supply of DC power to the image forming control unit 10 from the first power source 31, and the image forming control unit 10 shifts from the reduced-power mode to the normal power supply mode (step S408).

Figure 6:
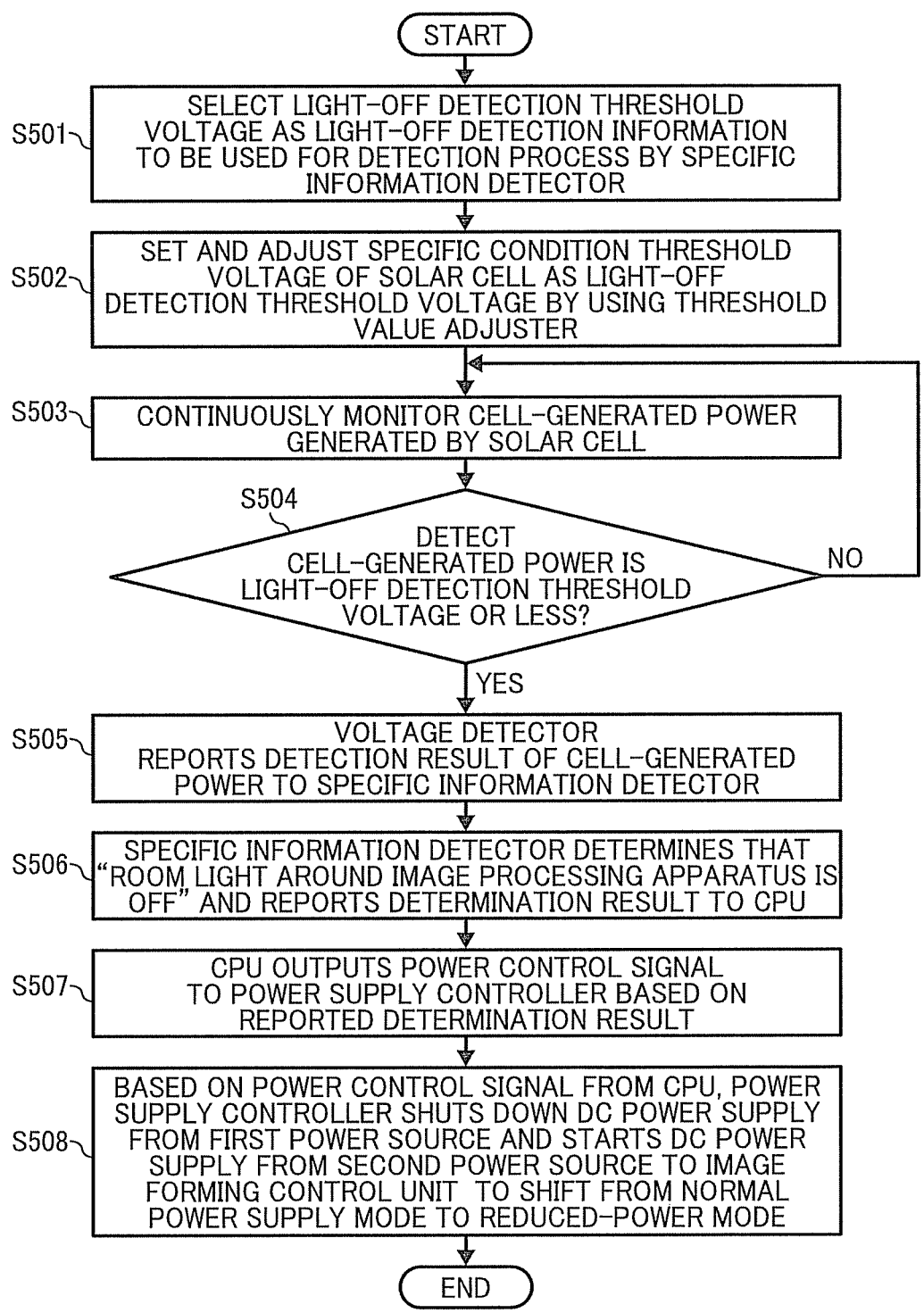
FIG. 6 shows a flowchart of steps in a process of power control by detecting ambient condition of image forming apparatus using light-OFF information as specific information, in which a mode shifts to a reduced-power mode.

A description is given of setting the light-OFF detection information for the image processing apparatus 1 to detect whether light is OFF in an installation place of the image processing apparatus 1, in which the light is external or ambient light such as room light, but not limited thereto. When the light-OFF detection threshold voltage to determine whether light is OFF in the installation place of the image processing apparatus 1 is set as the condition-specific threshold voltage, a power control process for the image processing apparatus 1 can be executed as shown in FIG. 6. The light-OFF detection threshold voltage can be used whether the light intensity around the image processing apparatus 1 becomes a given level or less.

When an administrator selects a light-OFF detection threshold voltage from the threshold table stored in the memory 12 by operating the operation display 14 selected (step S501), the threshold value adjuster 18 sets the light-OFF detection threshold voltage to the memory 12 as the condition-specific threshold voltage (step S502) to determine an environmental condition of the image processing apparatus 1. As such, the environmental condition of the image processing apparatus 1 can be determined.

The voltage detector 16 may continuously detect or monitor the cell-generated power voltage generated by the solar cell 15 during the normal power supply mode that the grid power is supplied to the first power source 31, wherein the grid power is converted and adjusted to the power used for the image forming apparatus 1 by the first power source 31 (step S503).

The detected cell-generated power voltage is compared with the light-OFF detection threshold voltage set by the threshold value adjuster 18, and checks whether the cell-generated power voltage becomes the light-OFF detection threshold voltage or less (step S504).

If the cell-generated power voltage of the solar cell 15 is greater than the light-OFF detection threshold voltage, the process returns to step S503, and the voltage detector 16 repeats the detection of cell-generated power of the solar cell 15 and then conducts a comparison processing at steps S503 and S504.

If the cell-generated power voltage of the solar cell 15 becomes the light-OFF detection threshold voltage or less, the voltage detector 16 reports the detection result that the cell-generated power becomes the light-OFF detection threshold voltage or less to the specific information detector 17 (step S505).

Upon receiving a report of the detection information that the cell-generated power becomes the light-OFF detection threshold voltage or less from the voltage detector 16, the specific information detector 17 determines that "room light around the image processing apparatus is OFF" and reports the determination result to the CPU 11 (step S506).

Based on the detection information reported from the specific information detector 17, the CPU 11 outputs a power control signal to the power supply controller 34 (step S507).

Based on the power control signal from the CPU 11, the power supply controller 34 shutdowns the supply of DC power to the image forming control unit 10 from the first power source 31, which is the normal power supply mode, and the power supply controller 34 initiates or starts the supply of DC power to the image forming control unit 10 from the second power source 32 using charges stored in the storage cell, and the image forming control unit 10 shifts from the normal power supply mode to the reduced-power mode (step S508).

Figure 7:
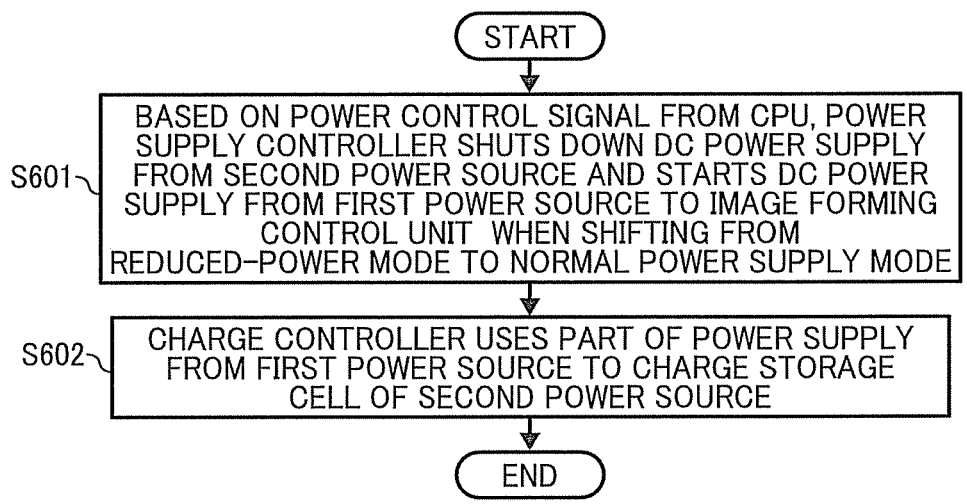
FIG. 7 shows a flowchart of steps in a process of charging a storage cell of a second power source by a first power source.

Upon shifting the mode of image processing apparatus 1 from the reduced-power mode to the normal power supply, the power generated by the first power source 31 can be used to charge the storage cell of the second power source 32 using the charge controller 33 as shown in FIG. 7.

Specifically, when shifting the mode of image processing apparatus 1 from the reduced-power mode to the normal power supply, the power supply controller 34 shuts down the supply of DC power to the image forming control unit 10 from the second power source 32, and initiates or starts the supply of DC power to the image forming control unit 10 from the first power source 31 based on the control signal from the CPU 11 (step S601).

Under the control of CPU 11, the mode of charge controller 33 shifts to the normal power supply mode, and then the charge controller 33 charges the storage cell of the second power source 32 using a partial power supplied from the first power source 31 (step S602).

As such, the image processing apparatus 1 can be configured as follows. The first power source 31 generates power to be used in the image processing apparatus 1 from the grid power supplied from an external source. The solar cell 15 (used as a photovoltaic power generation device) generates power with a voltage corresponding to the light intensity of light received by the solar cell 15, and the cell-generated power can be stored in the storage cell of the second power source 32. The second power source 32 generates power to be used in the image processing apparatus 1 from the power stored in the storage cell. The voltage detector 16 detects the cell-generated power voltage output from the solar cell 15. The memory 12 stores a given number of the condition-specific threshold voltages used to determine a given number of specific conditions of the image processing apparatus. The specific information detector 17 compares the cell-generated power voltage detected by the voltage detector 16 and the condition-specific threshold voltages stored in the memory 12. Based on the detection result of the specific information detector 17, the CPU 11 switches the mode between the normal power supply mode and the reduced-power mode using the power supply controller 34. As for the normal power supply mode, the first power source 31 conducts a power supply in the image processing apparatus 1. As for the reduced-power mode, the power supply from the first power source 31 is stopped, and the second power source 32 conducts a power supply to a limited given units or parts in the image processing apparatus 1, which may need to be supplied during the reduced-power mode.

Therefore, without using a specific sensor to detect a specific condition, the consumption power of image processing apparatus 1 can be reduced and user's convenience can be enhanced at a low cost using the cell-generated power of the solar cell 15.

Further, as for the image processing apparatus 1, the memory 12 stores the user presence detection threshold voltage (user existence detection threshold voltage) to determine whether a user or operator using the image processing apparatus 1 exists as the condition-specific threshold voltage. If the cell-generated power voltage detected by the voltage detector 16 is less than the user presence detection threshold voltage during the reduced-power mode, it is determined that a user is detected, and the CPU 11 switches from the reduced-power mode to the normal power supply mode using the power supply controller 34.

Therefore, without using a specific sensor (e.g., human body sensor) to detect the existence of user or operator, based on the cell-generated power of the solar cell 15, it can detect that a user using the image processing apparatus 1 exists at a low cost, and the mode of the image processing apparatus 1 can be switched from the reduced-power mode to the normal power supply mode, and thereby the consumption power of image processing apparatus 1 can be reduced and user's convenience can be enhanced at a low cost using the cell-generated power of the solar cell 15.

Further, as for the image processing apparatus 1, the memory 12 stores the no-user presence detection threshold voltage to determine whether a user or operator using the image processing apparatus 1 does not exist as the condition-specific threshold voltage. If the cell-generated power voltage detected by the voltage detector 16 becomes greater than the no-user presence detection threshold voltage during the normal power supply mode, it is determined that a user is not detected near the image processing apparatus 1, and the CPU 11 switches from the normal power supply mode to the reduced-power mode using the power supply controller 34.

Therefore, without using a specific sensor (e.g., human body sensor) to detect the no-existence of user or operator, based on the cell-generated power of the solar cell 15, it can detect that a user using the image processing apparatus 1 does not exist at a low cost, and the mode of the image processing apparatus 1 can be switched from the normal power supply mode to the reduced-power mode, and thereby the consumption power of image processing apparatus 1 can be further reduced and user's convenience can be further enhanced at a low cost using the cell-generated power of the solar cell 15.

Further, as for the image processing apparatus 1, the memory 12 stores the light-OFF detection threshold voltage to determine whether light is OFF around the image processing apparatus 1 as the condition-specific threshold voltage. If the cell-generated power voltage detected by the voltage detector 16 is less than the light-OFF detection threshold voltage, it is determined that light is OFF around the image processing apparatus 1, and the CPU 11 switches from the normal power supply mode to the reduced-power mode by using the power supply controller 34.

Therefore, without using a specific sensor (e.g., light sensor) to detect that the light is OFF, based on the cell-generated power of the solar cell 15, it can detect that light is OFF in the installation place of the image processing apparatus 1 at a low cost, and the mode of the image processing apparatus 1 can be switched from the normal power supply mode to the reduced-power mode, and thereby the consumption power of image processing apparatus 1 can be further reduced and user's convenience can be further enhanced at a low cost using the cell-generated power of the solar cell 15.

Further, as for the image processing apparatus 1, the memory 12 stores the light-ON detection threshold voltage to determine whether light is ON around the image processing apparatus 1 as the condition-specific threshold voltage. If the cell-generated power voltage detected by the voltage detector 16 becomes greater than the light-ON detection threshold voltage during the reduced-power mode, it is determined that light is ON around the image processing apparatus 1, and the CPU 11 switches from the reduced-power mode to the normal power supply mode by using the power supply controller 34.

Therefore, without using a specific sensor (e.g., light sensor) to detect that the light is ON, based on the cell-generated power of the solar cell 15, it can detect that light is ON in the installation place of the image processing apparatus 1 at a low cost, and the mode of the image processing apparatus 1 can be switched from the reduced-power mode to the normal power supply mode, and thereby the consumption power of image processing apparatus 1 can be further reduced and user's convenience can be further enhanced at a low cost using the cell-generated power of the solar cell 15.

Further, as for the image processing apparatus 1, the charge controller 33, used as the charger, can charge the storage cell of the second power source 32 using power generated by the first power source 31. Specifically, after the CPU 11 switches from the reduced-power mode to the normal power supply mode using the power supply controller 34, the charge controller 33 can charge the storage cell of the second power source 32 using a part of power generated by the first power source 31. Therefore, the storage cell of the second power source 32 can be effectively charged, by which user's convenience can be enhanced.

The present invention can be applied to image processing apparatuses such as copiers, printers, multi-functional apparatuses, a power control method of image processing apparatus, a power control program of image processing apparatuses, and a storage medium of power control program by using a photovoltaic power generation device such as a solar cell while enhancing user's convenience and reducing consumption power. Although the above described example embodiment is explained with an image forming apparatus, the applicable fields is not limited to image forming apparatuses, but the present invention can be applied other apparatuses such as electrical appliances or machines which need efficient and effective power-use depending on use environment of appliances or machines.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An electronic apparatus, comprising:
 a first power source to generate power to be used for the electronic apparatus from power supplied from an external power source;
 a photovoltaic power generation device to generate power having a voltage corresponding to an intensity of external light received by the photovoltaic power generation device as cell-generated power;
 a power storage device to store the cell-generated power generated by the photovoltaic power generation device;
 a second power source to generate power to be used for the electronic apparatus from the cell-generated power stored in the power storage device;
 a mode switching unit to switch between a normal power supply mode and a reduced-power mode, wherein in the normal power supply mode power is supplied from the first power source to each unit in the electronic apparatus while in the reduced-power mode the power supply from the first power source to each unit in the electronic apparatus is stopped and power is supplied from the second power source to only certain predetermined units in the electronic apparatus;
 a voltage detector to detect the voltage of the cell-generated power output from the photovoltaic power generation device;
 a memory to store a given number of condition-specific threshold voltages useable to determine a given number of specific conditions of the electronic apparatus; and
 a power supply controller to compare the voltage of the cell-generated power detected by the voltage detector and the condition-specific threshold voltages and control the mode switching unit to switch between the normal power supply mode and the reduced-power mode.

2. The electronic apparatus of claim 1, wherein the condition-specific threshold voltage includes a user presence detection threshold voltage, below which a user using the electronic apparatus is assumed to be present near the apparatus,
 wherein when the cell-generated power voltage detected by the voltage detector is less than the user presence detection threshold voltage in the reduced-power mode, the user is assumed to be present and the power supply controller instructs the mode switching unit to switch from the reduced-power mode to the normal power supply mode.

3. The electronic apparatus of claim 1, wherein the condition-specific threshold voltage includes a no-user presence detection threshold voltage, above which a user using the electronic apparatus is assumed to be not present near the apparatus,
 wherein when the cell-generated power voltage detected by the voltage detector becomes greater than the no-user presence detection threshold voltage in the normal power supply mode, the user is assumed to be not present and the power supply controller instructs the mode switching unit to switch from the normal power supply mode to the reduced-power mode.

4. The electronic apparatus of claim 1, wherein the condition-specific threshold voltage includes a light-OFF detection threshold voltage, below which a light around the electronic apparatus is assumed to be OFF,
 wherein when the cell-generated power voltage detected by the voltage detector is less than the light-OFF detection threshold voltage in the normal power supply mode, the light around the electronic apparatus is assumed to be OFF and the power supply controller instructs the mode switching unit to switch from the normal power supply mode to the reduced-power mode.

5. The electronic apparatus of claim 1, wherein the condition-specific threshold voltage includes a light-ON detection threshold voltage, above which a light around the electronic apparatus is assumed to be ON,
 wherein when the cell-generated power voltage detected by the voltage detector becomes greater than the light-ON detection threshold voltage in the reduced-power mode, the light around the electronic apparatus is assumed ON, and the power supply controller instructs the mode switching unit to switch from the reduced-power mode to the normal power supply mode.

6. The electronic apparatus of claim 1, further comprising a charger to charge the power storage device with power generated by the first power source,
 wherein the power supply controller instructs the charger to charge the power storage device using some of the power generated by the first power source upon switching from the reduced-power mode to the normal power supply mode.

7. A method of controlling power supply for an electronic apparatus, comprising the steps of:
 1) generating primary power to be used for the electronic apparatus from power supplied from an external power source;
 2) generating photovoltaic power having a voltage corresponding to intensity of an external light received by a photovoltaic power generation device;
 3) storing the photovoltaic power to a power storage device;
 4) generating secondary power to be used for the electronic apparatus from the power stored in the power storage device;
 5) switching between a normal power supply mode and a reduced-power mode, wherein in the normal power supply mode power is supplied to each unit in the electronic apparatus using the primary power, and in the reduced-power mode the supply of primary power is stopped and power is supplied to certain predetermined units in the electronic apparatus using the secondary power;
 6) detecting voltage of the photovoltaic power;
 7) comparing the voltage of the power detected in the voltage detecting step and condition-specific threshold voltages stored in a memory and correlated with a given number of condition-specific threshold voltages useable to determine a given number of specific conditions of the electronic apparatus; and
 8) controlling the switching between the normal power supply mode and the reduced-power mode conduct-able by the mode switching step based on a result of the comparing step.

8. A non-transitory computer-readable medium storing a program comprising instructions that when executed by a computer cause the computer to execute a method of controlling power supply for an electronic apparatus, the method comprising the steps of:
 1) generating primary power to be used for the electronic apparatus from power supplied from an external power source;

2) generating photovoltaic power having a voltage corresponding to intensity of an external light received by a photovoltaic power generation device;
3) storing the photovoltaic power to a power storage device;
4) generating secondary power to be used for the electronic apparatus from the power stored in the power storage device;
5) switching between a normal power supply mode and a reduced-power mode, wherein in the normal power supply mode power is supplied to each unit in the electronic apparatus using the primary power, and in the reduced-power mode the supply of primary power is stopped and power is supplied to certain predetermined units in the electronic apparatus using the secondary power;
6) detecting voltage of the photovoltaic power;
7) comparing the voltage of the power detected in the voltage detecting step and condition-specific threshold voltages stored in a memory and correlated with a given number of condition-specific threshold voltages useable to determine a given number of specific conditions of the electronic apparatus; and
8) controlling the switching between the normal power supply mode and the reduced-power mode conduct-able by the mode switching step based on a result of the comparing step.

\* \* \* \* \*